United States Patent
Karjck et al.

(10) Patent No.: US 8,532,481 B2
(45) Date of Patent: Sep. 10, 2013

(54) DUAL FAULT TOLERANT OPTICAL NETWORKING WITH FAST PROTECTION PERFORMANCE

(75) Inventors: Thomas T. Karjck, Wheaton, IL (US); Dion Kwun Kit Loung, Aurora, IL (US); Jonathan B. Sadler, Naperville, IL (US); Digvijay Sharma, Noida (IN); Ramesh Kuppusamy, Singapore (SG); David W. Jenkins, North Aurora, IL (US)

(73) Assignee: Tellabs Operations, Inc., Naperville, IL (US)

( * ) Notice: Subject to any disclaimer, the term of this patent is extended or adjusted under 35 U.S.C. 154(b) by 650 days.

(21) Appl. No.: 12/694,398

(22) Filed: Jan. 27, 2010

(65) Prior Publication Data
US 2010/0232784 A1 Sep. 16, 2010

Related U.S. Application Data (60) Provisional application No. 61/147,981, filed on Jan. 28, 2009.

(51) Int. Cl.
*G02F 1/00* (2006.01)
(52) U.S. Cl.
USPC .............. 398/5; 398/2; 398/3; 398/4; 398/33; 398/34; 398/38; 398/45; 398/48; 398/49; 398/50; 398/56; 398/57; 398/58; 398/59; 370/242; 370/401; 370/254; 370/351; 370/227; 370/228; 370/230; 370/400; 370/235

(58) Field of Classification Search
USPC .................. 398/1, 2, 3, 4, 5, 7, 8, 10, 12, 13, 398/14, 17, 20, 25, 26, 27, 33, 34, 37, 38, 398/45, 47, 48, 49, 50, 51, 57, 56, 58, 59, 398/83, 79, 30, 31, 32; 370/216, 225, 228, 370/235, 254, 352, 392, 218, 351, 400, 401, 370/230, 231, 227, 389, 242
See application file for complete search history.

(56) References Cited

U.S. PATENT DOCUMENTS

| | | | |
|---|---|---|---|
| 2003/0016414 A1* | 1/2003 | Solheim et al. | 359/127 |
| 2004/0170426 A1* | 9/2004 | Fumagalli et al. | 398/5 |
| 2010/0027989 A1* | 2/2010 | Lewis et al. | 398/2 |
| 2010/0142943 A1* | 6/2010 | Frankel et al. | 398/25 |

* cited by examiner

*Primary Examiner* — Hanh Phan
(74) *Attorney, Agent, or Firm* — Hamilton, Brook, Smith & Reynolds P.C.

(57) ABSTRACT

Optical networks occasionally experience a fault along a communications path. Service providers prefer to have an alternative communications path available to enable users to still communicate in a seamless manner. Accordingly, a method and corresponding apparatus for providing path protection for dedicated paths in an optical network is provided.

21 Claims, 10 Drawing Sheets

DUAL FAULT TOLERANT OPTICAL NETWORKING WITH FAST PROTECTION PERFORMANCE

RELATED APPLICATION

This application claims the benefit of U.S. Provisional Application No. 61/147,981, filed on Jan. 28, 2009.

The entire teachings of the above application are incorporated herein by reference.

BACKGROUND OF THE INVENTION

Electrical and optical networks occasionally experience a fault along a communications path, such as at nodes along a path, due to power failure, for example, or on physical transmission lines or links, due to backhoe cuts, for example. Whatever the cause of the fault, service providers generally prefer to have an alternative communications path available to enable users to continue communications in a seamless manner.

SUMMARY OF THE INVENTION

Example embodiments of the present invention may be implemented in the form of a method or corresponding apparatus that provides path protection for dedicated paths in an optical network. A method and corresponding apparatus according to one embodiment of the present invention include accessing optical link information representing optical links forming optical paths from a source optical switch to a destination optical switch in an optical network. The optical paths include dedicated optical paths. In an event of a fault in a dedicated optical path, based on the optical link information accessed, the method determines, from among the optical paths, a protection optical path from the source optical switch to the destination optical switch, where the optical link information of the protection optical path meets an optical criterion. After determining a protection optical path, the method causes the destination optical switch and intermediary optical switches to instantiate links forming the protection optical path from the source optical switch to the destination optical switch to provide path protection for the dedicated path without the fault in the optical network.

As used herein, to instantiate a link means to activate a concrete representation of the link to enable communications, such as optical signals, to be physically transmitted over the link. The representation includes hardware, software or a combination of hardware and software network elements.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

DETAILED DESCRIPTION OF THE INVENTION

A description of example embodiments of the invention follows.

Figure 1A:
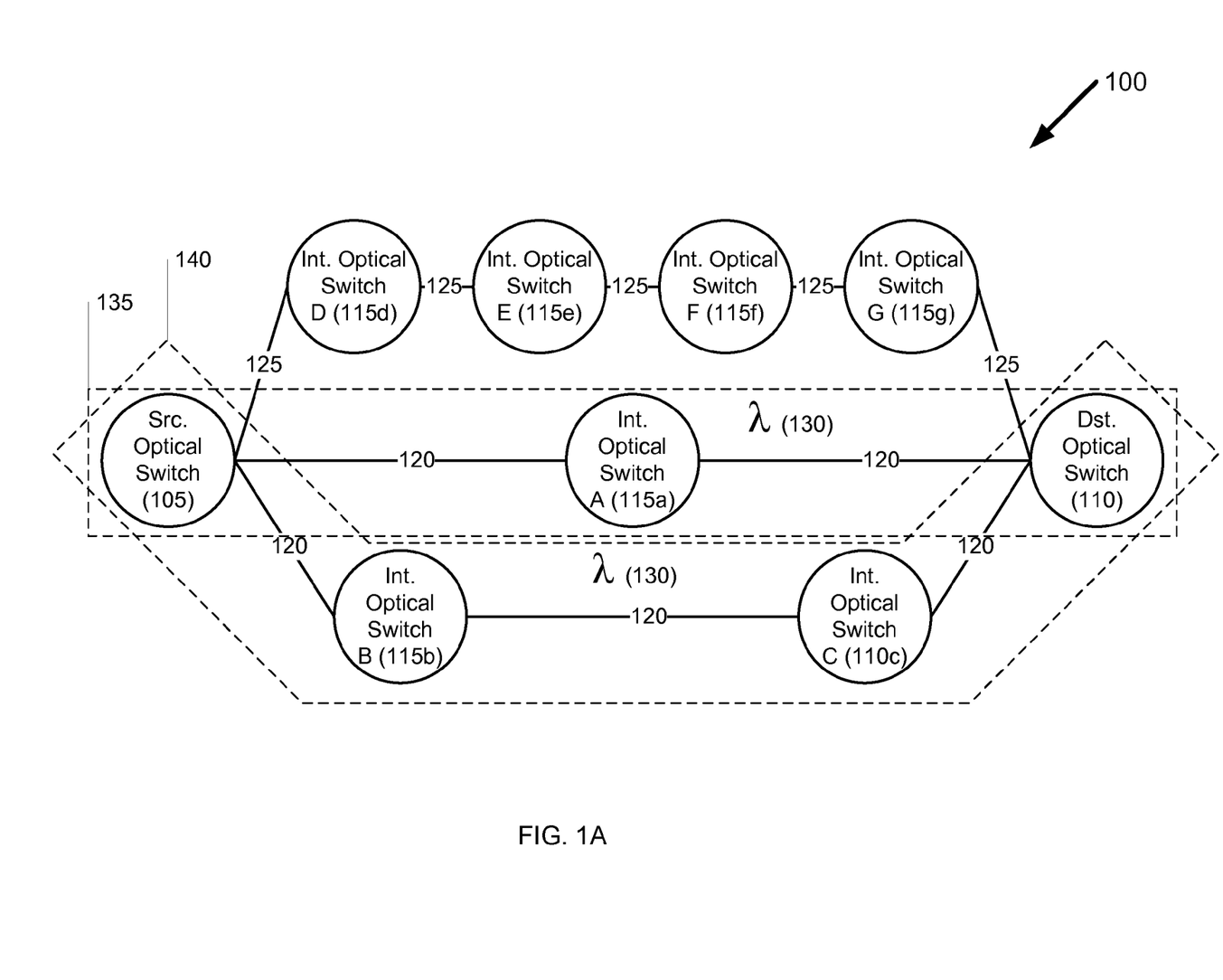
FIGS. 1A-C are network diagrams of an example optical network where example embodiments may be employed.
Figure 1B:
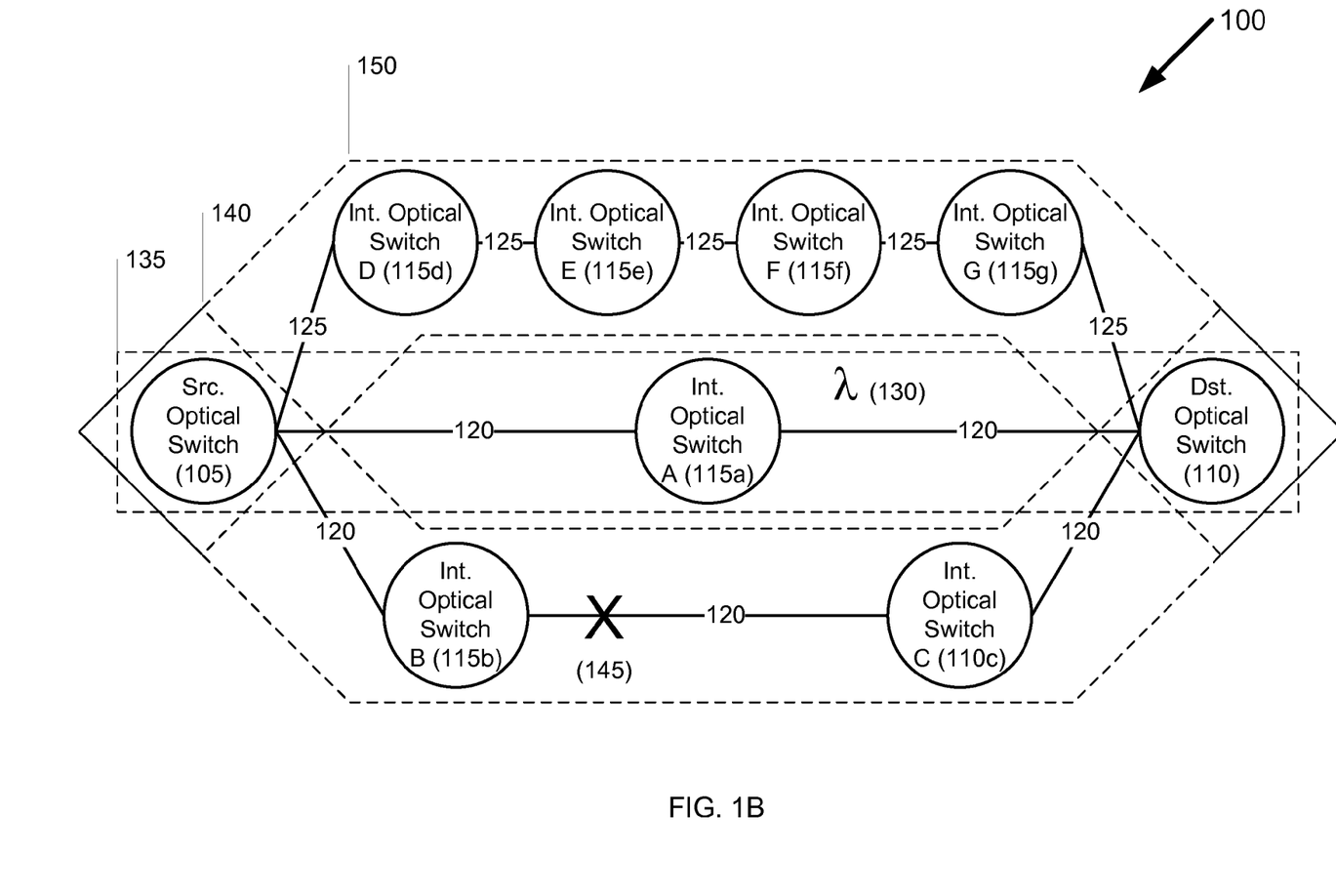
Figure 1C:
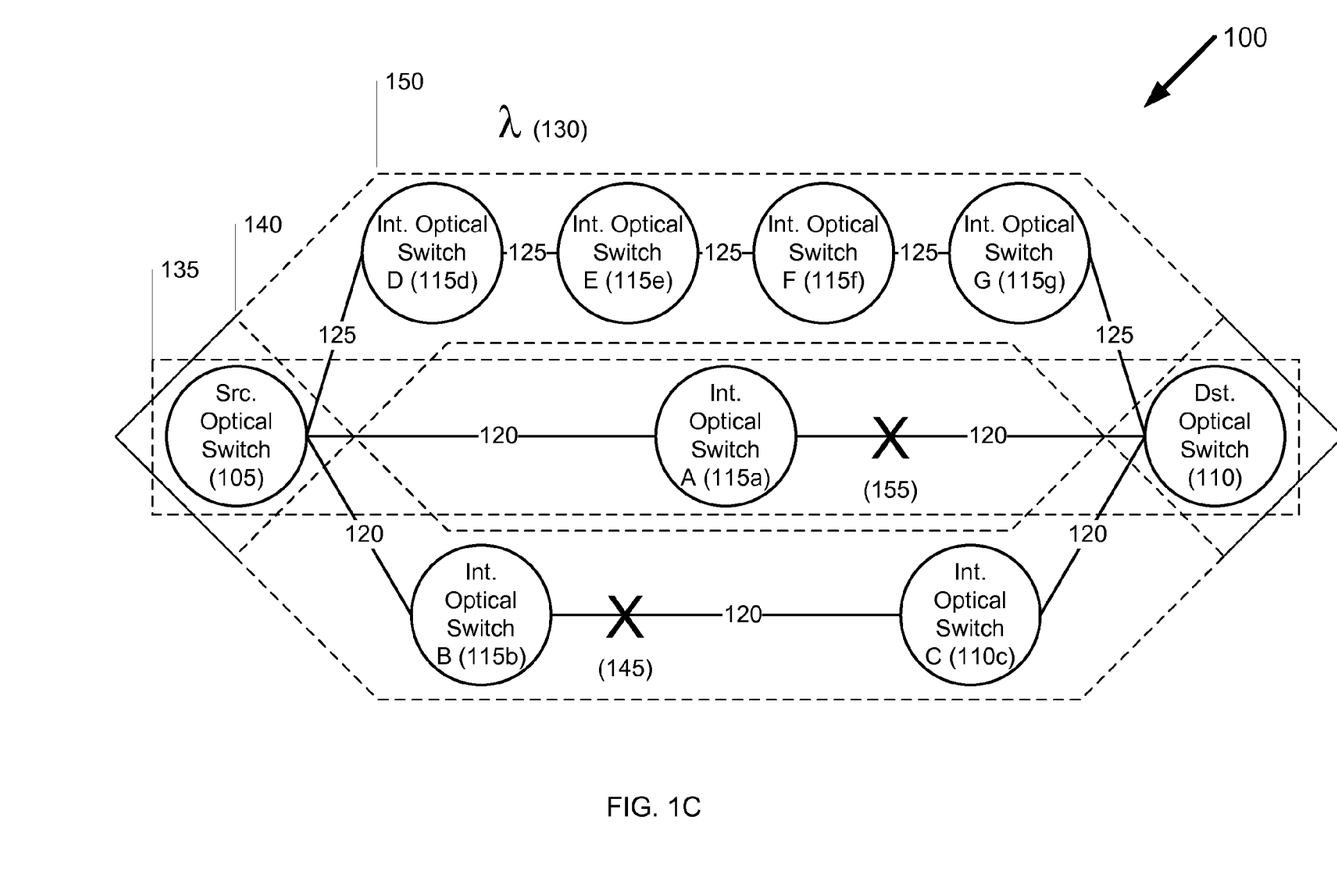

FIGS. 1A-C illustrate an optical network 100 with optical paths from a source optical switch 105 to a destination optical switch 110. The optical paths include intermediary nodes A-G, 115a-g, and optical links 120 and 125 therein between. The optical links 120 and 125 forming the optical paths are represented by optical link information.

The optical link information includes information about the links 120 and 125. The optical link information may include, for example, optical signal-to-noise ratio, chromatic dispersion, polarization mode dispersion, and other optical characteristics of the optical links 120 and 125.

The optical link information maybe maintained by individual optical switches and then communicated or otherwise shared with other optical switches using a link-state routing protocol such as Open Shortest Path First (OSPF), Intermediate System to Intermediate System (IS-IS), Private Network-to-Network Interface (PNNI), and Nimrod Routing Architecture.

Alternatively, the optical link information may be maintained by a central entity, such as an element management system (EMS) or Network Management System (NMS), and then communicated to individual optical switches.

Independent of a specific mechanism for maintaining and communicating optical link information, an example embodiment accesses the optical link information. The optical link information represents optical links that form optical paths, including dedicated optical paths, from a source optical switch to a destination optical switch in an optical network. In one embodiment, an optical control plane in a configuration entity accesses the optical link information. In another embodiment, an optical control plane in a source optical switch accesses the optical link information.

In FIG. 1A, optical paths from the source optical switch 105 to the destination optical switch 110, through intermediary optical switch A 115a, and from the source optical switch 105 to the destination optical switch 110, through intermediary optical switches B 115b and C 115c, are dedicated optical paths 135 and 140, respectively. Additionally, the dedicated optical paths 135 and 140 provide fault tolerance, as described immediately below in reference to FIG. 1B.

In FIG. 1B, despite the dedicated optical path 140 experiencing a fault 145 (e.g., a backhoe cutting a link 120), the dedicated optical path 135 still carries traffic 130 and customer services are uninterrupted. As such, the dedicated optical paths 135 and 140 may be said to tolerate the fault 145. Further, it may be convenient to label one of the dedicated optical paths as a "working path," and other dedicated optical paths as "protection paths."

In an event of the fault 145, based on the optical link information accessed, the embodiment determines, from among the optical paths, a protection path 150 from the source optical switch 105 to the destination optical switch 110. In the example illustrated in FIG. 1B, the protection optical path 150 is from the source optical switch 105 to the destination optical switch 110, through intermediate optical switches D-G, 115d-g.

The protection optical path 150 is selected because its corresponding optical link information is determined to meet an optical criterion. For example, the optical link information can include several parameters or metrics, such as optical signal-to-noise ratio, chromatic dispersion, polarity mode dispersion, or other optical characteristics of the links 125 forming the protection optical path 150 and the protection optical path 150 may be selected because the parameters or metrics meet or otherwise satisfy respective thresholds. Alternatively, a combination of parameters or metrics may meet or otherwise satisfy respective combined thresholds. One of ordinary skill in the art will readily recognize that other optical criteria or comparisons are contemplated by embodiments of the present invention.

Continuing with the current embodiment, the embodiment causes the destination optical switch 110 and the intermediate optical switches D-G, 115d-g to instantiate the links 125 forming the protection optical path 150.

As used herein, to instantiate a link means to activate a concrete representation of the link to enable communications, such as optical signals, to be physically transmitted over the link. The representation includes hardware, software or a combination of hardware and software network elements.

The embodiment, with the protection optical path 150 from the source optical switch 105 to the destination optical switch 110, provides path protection for the still active dedicated optical paths 135 and 140 in the optical network 100.

In FIG. 1C, given the dedicated optical path 140 experiencing the fault 145, in an event of a second fault in the remaining dedicated optical paths, another embodiment uses the instantiated links 125 that form the protection optical path 150. In the example illustrated in FIG. 1C, the dedicated optical path 135 (i.e., the remaining dedicated optical path) is experiencing a fault 155 (i.e., the second fault). In this embodiment, despite the dedicated optical paths 135 and 140 experiencing faults 145 and 155, respectively, the protection optical path 150 carries traffic 130, so customer service is uninterrupted. In an event of a fault in a dedicated optical path is corrected (e.g., the fault 155 is corrected), an embodiment of the invention reverts use of the links 125 forming the protection optical path 150 to use of the links 120 forming the corrected dedicated optical path.

Figure 2:
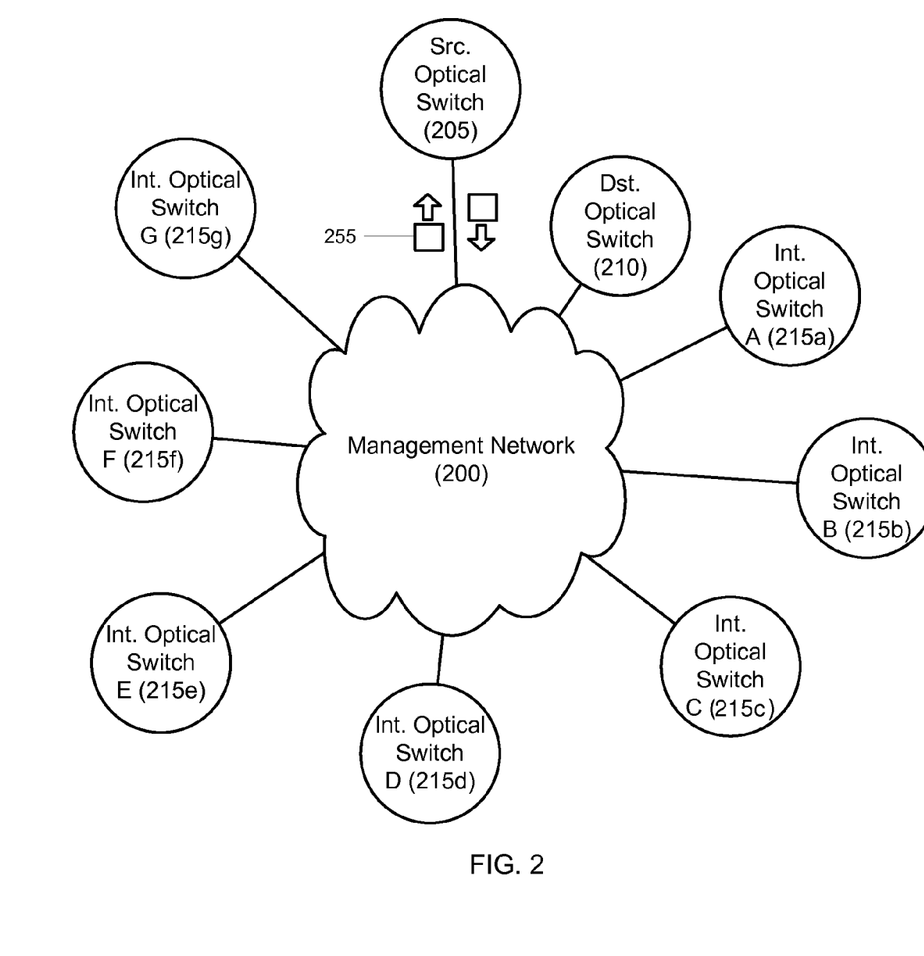
FIG. 2 is a network diagram of a management network.

FIG. 2 is a network diagram of a management network 200 that networks a source optical switch 205, destination optical switch 210, and intermediary optical switches A-G, 215a-g. The management network 200 differs from an optical network (e.g., the optical network 100 of FIGS. 1A-C). The optical network networks optical switches. Links between the networked optical switches carry application-layer data, such as Web traffic, Voice over Internet Protocol (VoIP) traffic, and e-mail traffic.

In contrast, the management network 200 carries communication 255 supporting or otherwise enabling an embodiment to access optical link information representing optical links forming optical paths between the source optical switch 205 and the destination optical switch 210, and to cause the destination optical switch 210 and the intermediary optical switches A-G, 215a-g to instantiate links forming optical paths between the source optical switch 205 and the destination optical switch 210, as discussed previously in reference to FIGS. 1A-B.

The communications 255 may be unidirectional (e.g., request message) or bidirectional (e.g., request and response messages). The communications 255 may be packets, such as Internet Protocol (IP) packets. Accordingly, the management network 200 may be a packet-based or packet switched network, such as an IP network. The communications 255 may be one-to-one (e.g., IP unicast), one-to-many (e.g., IP multicast), or one-to-all (e.g., IP broadcast).

A convenient embodiment causes links forming a protection optical path (e.g., the protection optical path 150 of FIG. 1B) to be instantiated by signaling (e.g., with the communications 255) a respective optical control plane on the destination optical switch 210 and the intermediary optical switches of the protection optical path.

The embodiment, based on the signaling, causes the destination optical switch 210 and the intermediary optical switches of the protection optical path to be configured to make available use of the links forming the protection optical path.

In another embodiment, signaling includes reserving optical layer resources on the destination optical switch 210 and intermediary optical switches of the protection optical path with a network-layer reservation protocol, such as Resource ReSerVation Protocol (RSVP), Next Step In Signaling (NSIS), Network Layer Signaling (NLS), Private Network-to-Network Interface (PNNI), Constraint-based Label Distribution Protocol (CR-LDP), ITU-T Recommendation Q.931, and extensions thereto.

It should be noted that illustrated embodiments described herein are described as using RSVP to reserve optical layer resources in an optical network (e.g., the optical network 100 of FIGS. 1A-C). It should be noted that other protocols that reserve resources, such as optical layer resources, in a communications network, such as an optical network, may take advantage of the present invention. RSVP is described by R. Braden et al., "Resource ReSerVation Protocol (RSVP)," Request For Comments (RFC) 2205, September 1997, available from the Internet Engineering Task Force (IETF).

Figure 3:
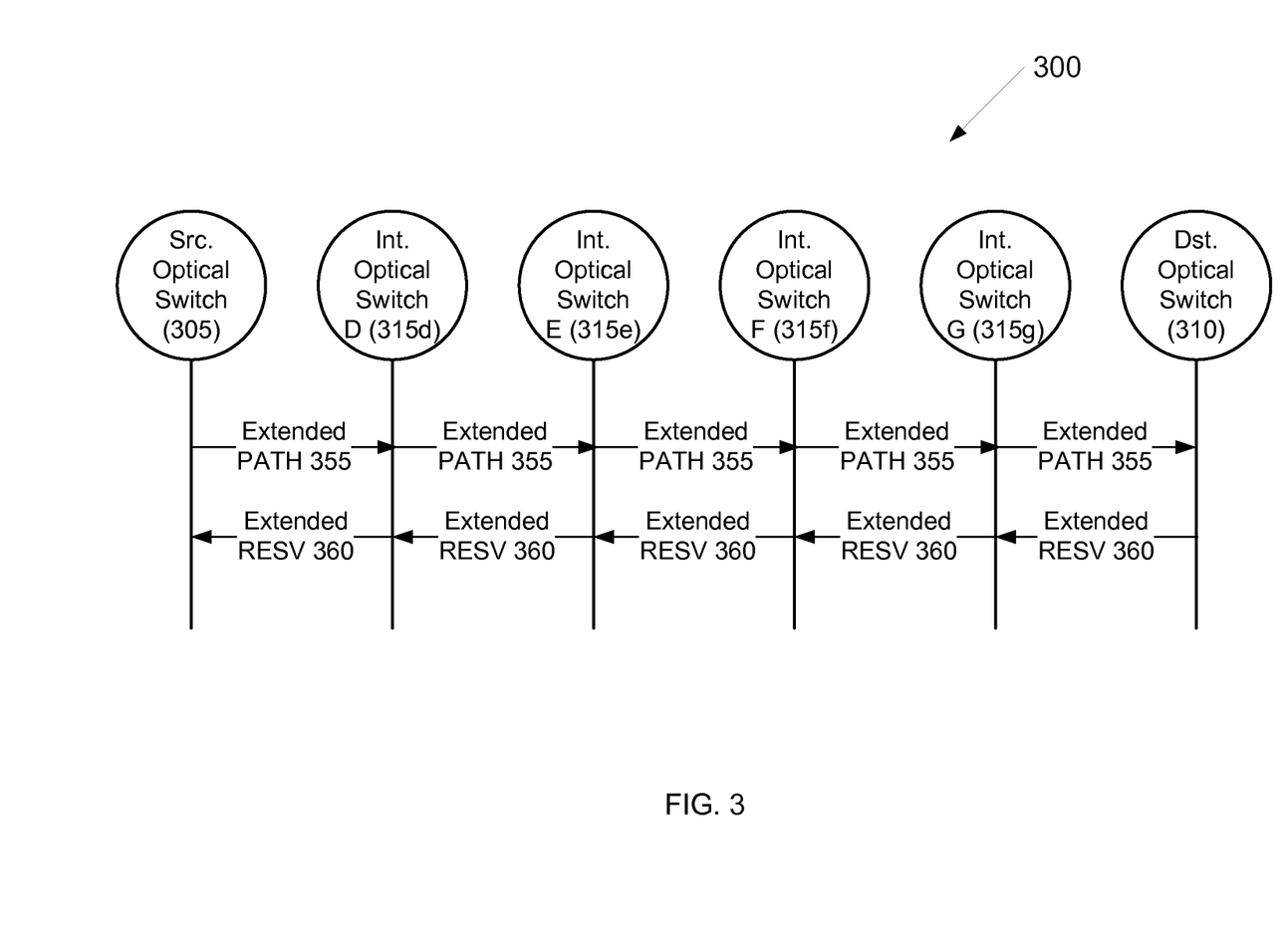
FIG. 3 is a message diagram of signaling messages, in accordance with an example embodiment.

FIG. 3 illustrates a protection optical path 300 from a source optical switch 305 to a destination optical switch 310, through intermediary optical switch D-G, 315d-g. An embodiment reserves optical layer resources on the destination optical switch 310 and the intermediary optical switch D-G, 315d-g using RSVP.

In accordance with RSVP described in RFC 2205, RSVP Path messages are used by a sender to indicate its presence as well as specify resources needed to accommodate a data flow between the sender and a receiver. The receiver establishes a new reservation for resources for a data flow between a sender and a receiver by responding to a sender's Path message with a reservation request (Resv) message. The Resv message travels upstream hop-by-hop along the path used by the Path message from the receiver to the sender. The Resv message contains information that is used by intermediate nodes along the path to reserve resources for the data flow.

Typically, RSVP (also NSIS and NLS) is used to reserve network-layer resources for data flows (corresponding to layer-3 (L3) of the Open Systems Interconnection Reference Model (OSI-RM). In contrast, in the context of the illustrated embodiments, RSVP is used atypically to reserve optical-layer resources (corresponding to layer-1 (L1) of the OSI-RM). Further, RSVP (also NSIS and NLS) is an "on-path" resource reservation protocol in which protocol messaging or signaling are communicated or otherwise exchanged over the datapath of the dataflow between the sender and receiver. In contrast, in the context of the illustrated embodiments, RSVP signaling is not communicated over a datapath of a dataflow between a sender and receiver (e.g., the links 120 and 125 of FIG. 1A-C), but over a different datapath (e.g., the management network 200 of FIG. 2). A convenient embodiment extends the RSVP Path and RSVP Resv message described in RFC 2205 as extended Path message 355 and extended Resv message 360 to accommodate the optical network environment.

Figure 4A:
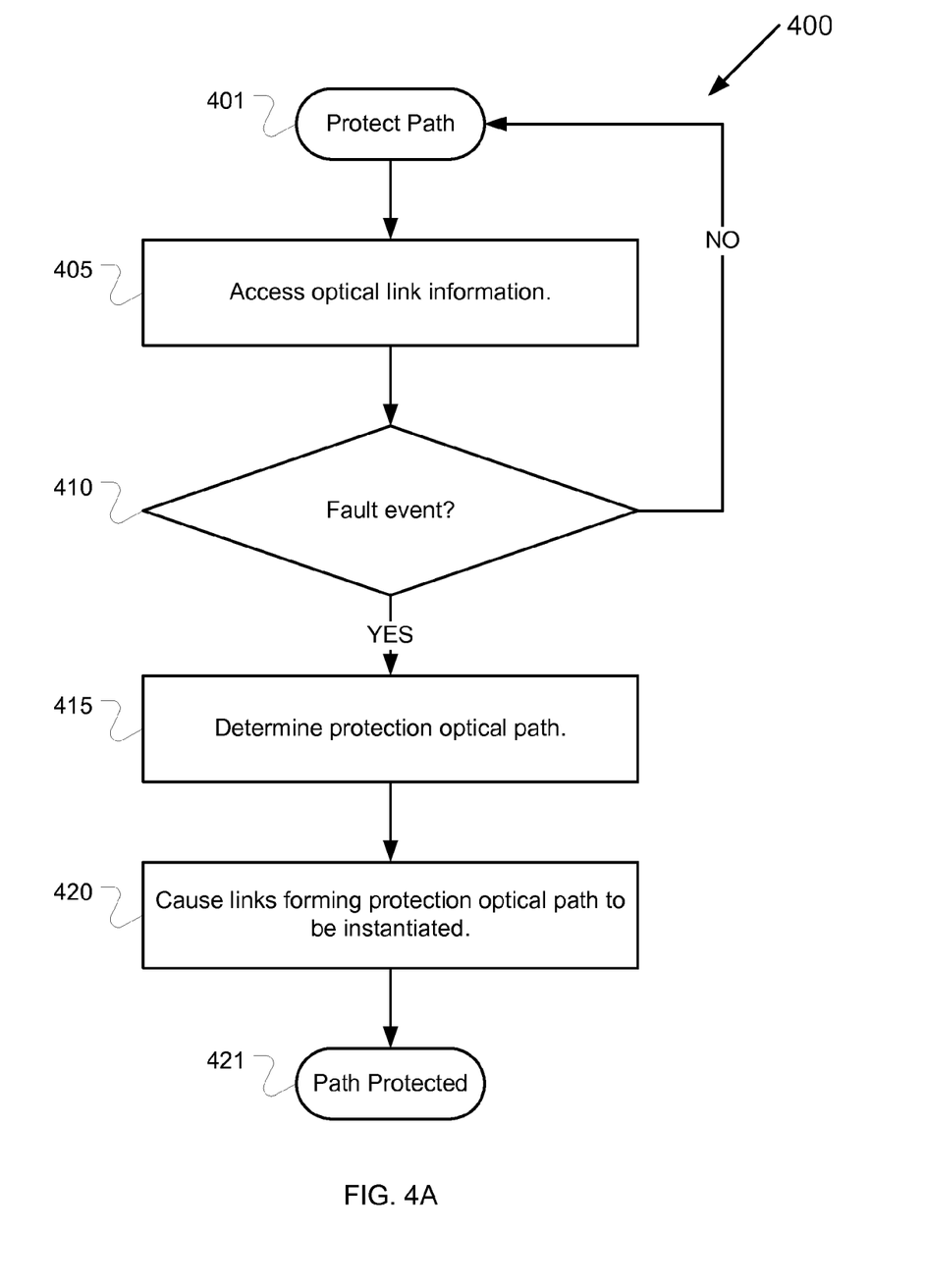
FIGS. 4A-C are flowcharts of example processes for providing path protection for dedicated paths in an optical network, in accordance with example embodiments.

FIG. 4A illustrates an example process 400 for providing path protection for dedicated paths in an optical network. The process 400 starts (401). The process 400 accesses (405) optical link information representing optical links forming optical paths from a source optical switch to a destination optical switch in the optical network. The optical link information includes information about links forming the optical paths, which include dedicated optical paths.

The process 400 determines (410) whether a fault in a dedicated optical path has occurred, for example, by receiving a fault indication or signal from another process or by monitoring dedicated optical paths. If the process 400 determines (410) that a fault in a dedicated optical path has occurred, based on the optical link information accessed (405), the process 400 determines (415) from among the optical paths, a protection optical path from the source optical switch to the destination optical switch; else the process 400 starts (401) again.

A convenient embodiment uses a link-state routing protocol, such as Open Shortest Path First (OSPF), Intermediate System to Intermediate System (IS-IS), Private Network-to-Network Interface (PNNI), and Nimrod Routing Architecture, to determine from the optical path information accessed, the protection optical path from the source optical switch to the destination optical switch.

Returning to FIG. 4A, the process 400 causes (420) the destination optical switch and intermediary optical switches to instantiate links forming the protection optical path from the source optical switch to the destination optical switch.

The process 400 ends (421) with path protection for the dedicated paths in the optical network provided.

The foregoing example process 400 may be executed by an optical control plane in a configuration entity. Alternatively, the process 400 may be executed by an optical control plane in a source optical switch.

Figure 4B:
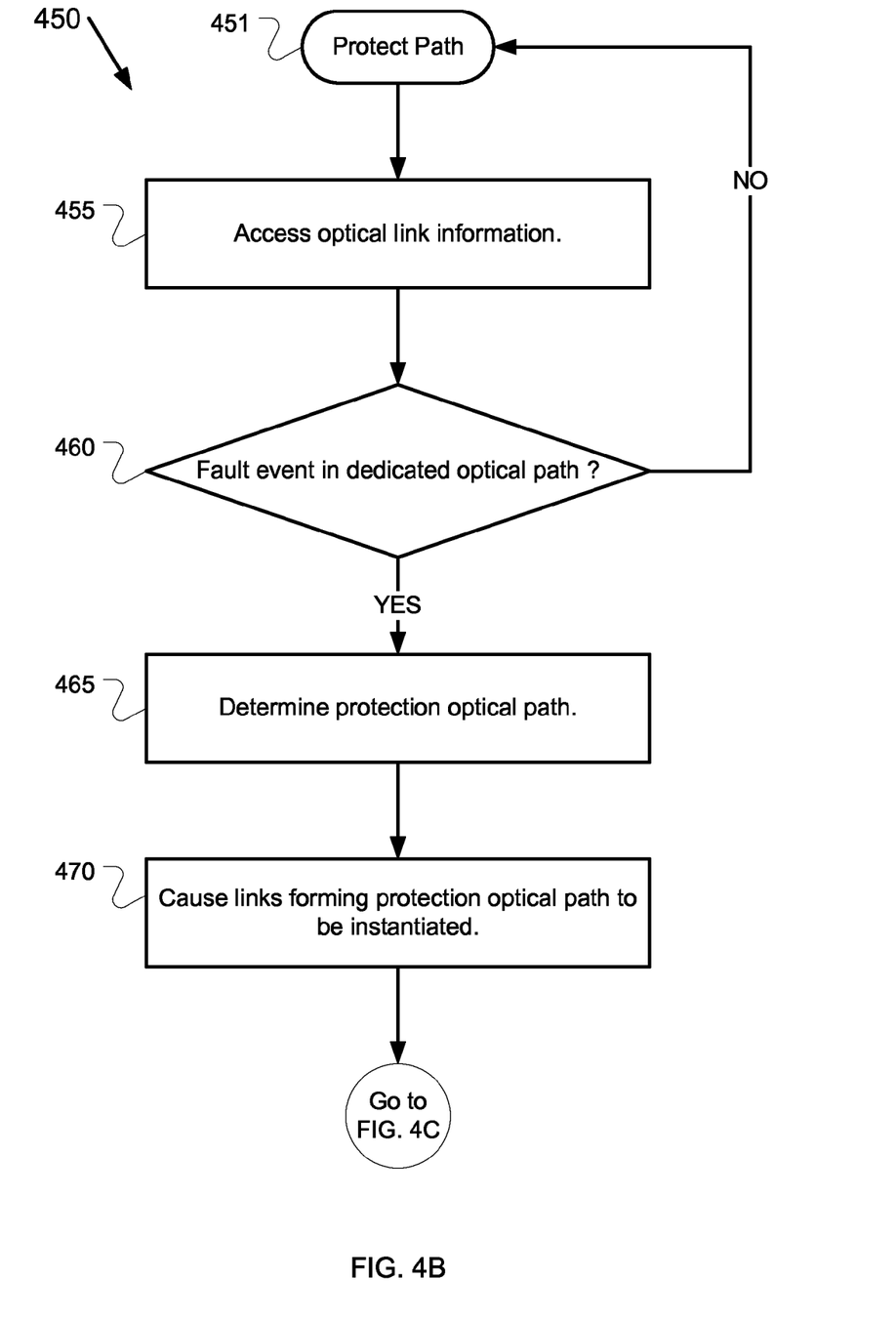

FIG. 4B illustrates an example process 450 for providing path protection for dedicated paths in an optical network. The process 450 starts (451). The process 450 accesses (455) optical link information representing optical links forming optical paths from a source optical switch to a destination optical switch in the optical network. The optical link information includes information about links forming the optical paths, which include dedicated optical paths.

The process 450 determines (460) whether a fault in a dedicated optical path has occurred, for example, by receiving a fault indication or signal from another process or by monitoring dedicated optical paths. If the process 450 determines (460) that a fault in a dedicated optical path has occurred, based on the optical link information accessed (455), the process 450 determines (465) from among the optical paths, a protection optical path from the source optical switch to the destination optical switch; else the process 450 starts (451) again.

The process 450 causes (470) the destination optical switch and intermediary optical switches to instantiate links forming the protection optical path from the source optical switch to the destination optical switch.

Figure 4C:
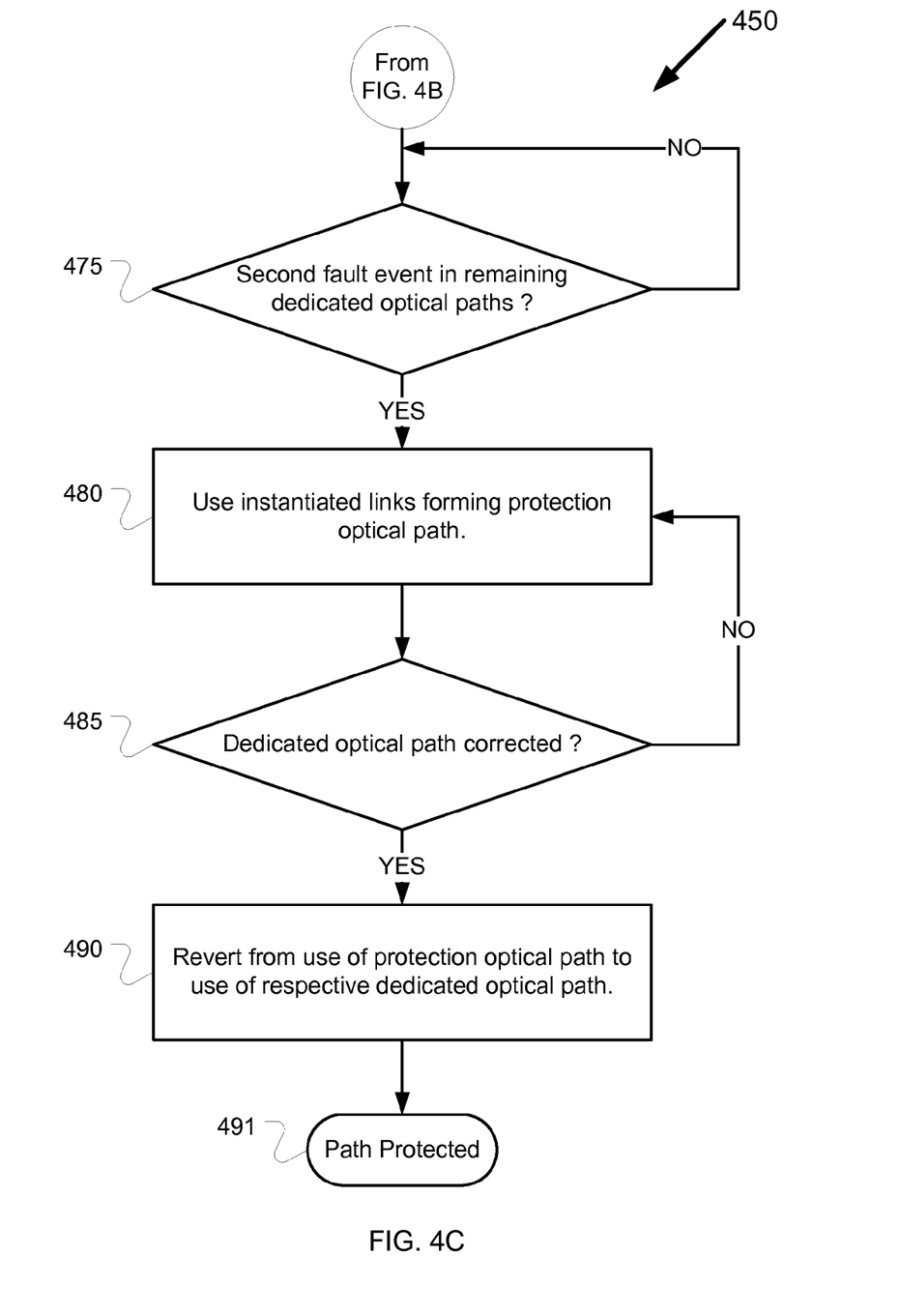

Continuing with FIG. 4C, the process 450 determines (475) whether a second fault in the remaining dedicated optical paths has occurred, for example, by receiving a fault indication or signal from another process or by monitoring dedicated optical paths. If the process 450 determines (475) that a second fault in the remaining dedicated optical paths has occurred, the process 450 uses (480) the instantiated links forming the protection optical path.

The process 450 determines (485) whether a fault in one of the dedicated optical paths is corrected. If the process 450 determines (485) that a fault in one of the dedicated optical paths is corrected, the process 450 reverts (490) use of links forming the protection optical path to use of links forming the respective dedicated optical path.

The process 450 ends (491) with path protection for the dedicated paths in the optical network provided.

The foregoing example process 450 may be executed by an optical control plane in a configuration entity. Alternatively, the process 450 may be executed by an optical control plane in a source optical switch.

Figure 5A:
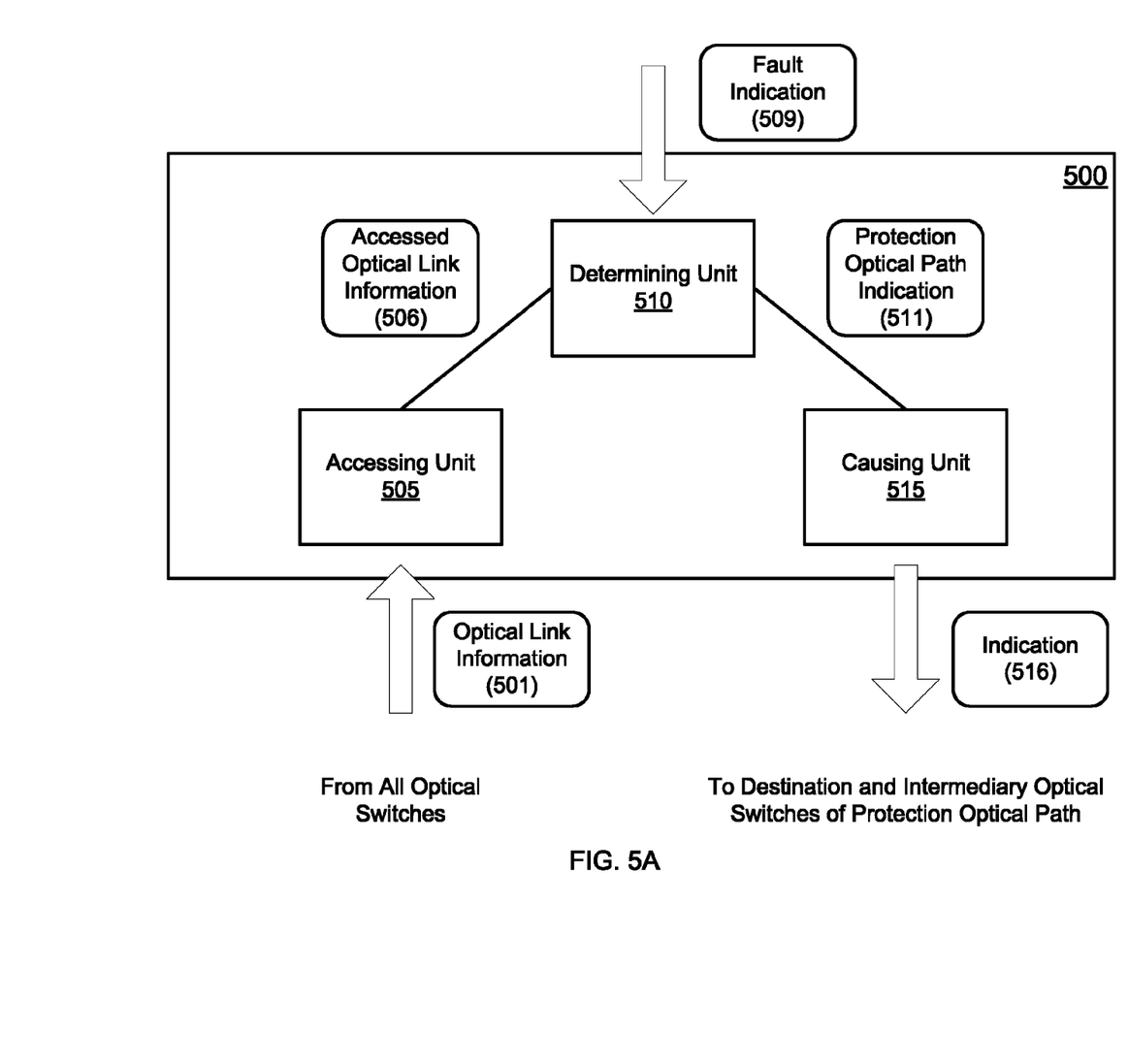
FIGS. 5A-B are block diagrams of example apparatuses to provide path protection for dedicated paths in an optical network, in accordance with example embodiments.

FIG. 5A illustrates an example apparatus 500 to provide path protection for dedicated paths in an optical network. The example apparatus 500 has an accessing 505 unit, determining unit 510, and causing unit 515. The accessing 505 unit being communicatively coupled to the determining unit 510, and the determining unit 510 communicatively coupled to the causing unit 515.

The accessing unit 505 accesses optical link information 501 representing optical links forming optical paths from a source optical switch to a destination optical switch in an optical network, resulting in accessed optical link information 506. The accessed optical link information 506 includes information about links forming the optical paths, which includes dedicated optical paths.

In an event of a fault in a dedicated optical path, denoted by a fault indication 509, the determining unit 510, based on the accessed optical link information 506, determines, from among the optical paths, a protection optical path from the source optical switch to the destination optical switch. A protection optical path indication 511 denotes the protection optical path determined by the determining unit 510. Optical link information of the protection optical path is determined to meet an optical criterion.

With the protection optical path indication 511, the causing unit 515 causes the destination optical switch and the intermediary optical switches to instantiate links forming the protection optical path from the source optical switch to the destination optical switch. With the protection optical path, the apparatus 500 provides path protection for dedicated paths in the optical network.

Figure 5B:
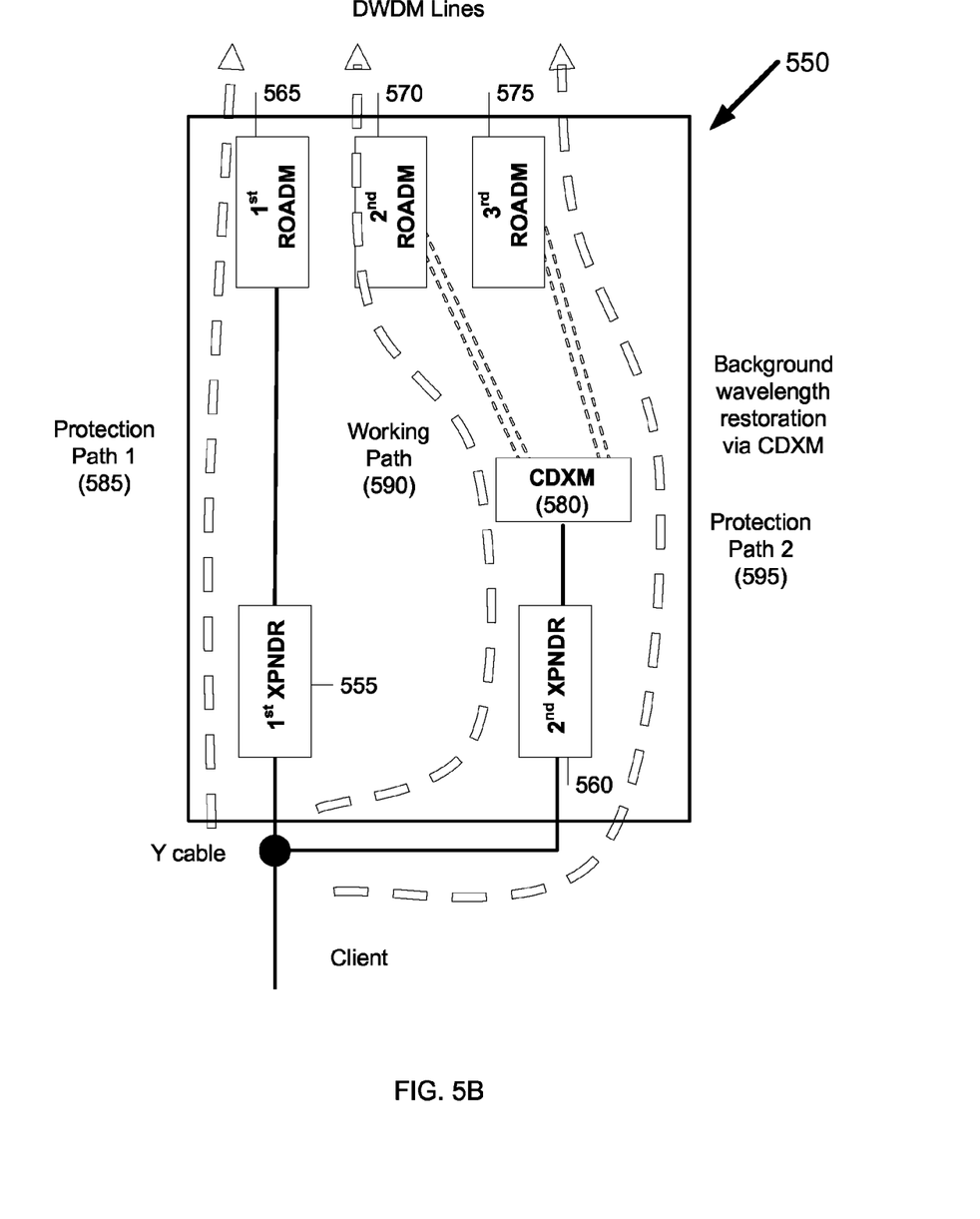

FIG. 5B illustrates an example optical node 550 that supports the instantiation of a third path (second protection path) 595. According to the example embodiment, the optical node 550 includes at least two transponders 555, 560. The first transponder 555 is coupled to a first reconfigurable optical add-drop multiplexer (ROADM) 565, and the second transponder 560 is coupled to a colorless directionless switch module (CDXM) 580. The CDXM 580 is further coupled to two more ROADMs (a second ROADM 570 and third ROADM 575).

The first transponder 555 and first ROADM 565 are dedicated to carrying traffic along a first path 585. The first path 585 may be, for example, a working path between the optical node 550 and another optical node (not shown) or may be a protection path assigned to support a working path. The second ROADM 570 is dedicated to carrying the traffic along a second path 590, which may be, for example, a protection path between the optical node 550 and the other optical node (not shown). As a protection path, the second path 590 may be assigned to support a working path, such as the first path 585. Alternatively, the second path 590 may be a working path between the optical node 550 and the other optical node (not shown) and may be supported by the first path 585, in which case the first path 585 would be a protection path.

The third ROADM 575 is used to support a third path 595 that can carry the traffic between the optical node 550 and the other optical node (not shown) in an event that both the first and second paths 585, 590 fail. According to the example embodiment, the third path 595 is instantiated upon a failure along either the first or second path 585, 590. When instantiated, the third path 595 is assigned to protect the path (from among the first and second paths 585, 590) that did not include the failure; thus, becoming a protection path for whichever of the first and second paths 585, 590 is the working path after the failure. This functionality allows the example embodiment to maintain "1+1 protection."

It should be noted that the second transponder 560 is not dedicated to carrying the traffic along any particular path, but may be used to carry the traffic along either the second path 590 or the third path 595. Configuring the CDXM 580 to be coupled to the second transponder 560, the second ROADM 570, and the third ROADM 575 makes this possible. This configuration also reduces the number of transponders included in the optical node 550, thereby reducing overall equipment costs.

A number of example embodiments and their features have been described. Additional embodiments and features include a method of providing highly reliable optical networking in a cost effective manner. The method combines dedicated protection resources and shared protection resources to provide fast protection switching for multiple network faults while reducing network costs. The method uses technologies, such as connectionless and directionless switching and optical layer control plane to enable the method.

Some optical networks require tolerance of more than one fault due to frequent occurrences of optical fiber failures. At the same time, fast protection is still desirable to have minimal impact to services using the optical network.

The example embodiments described are contrasted with other solutions that solve the foregoing problem at the electrical layer. Solving at the electrical layer results in large or lengthy restoration times and high costs. Other solutions include using true optical cross-connects, however, they typically do not have enough ports or monitoring capabilities, and thus are not cost effective.

In contrast, the example embodiments described above solve the foregoing problem at the optical layer, thereby minimizing the amount of switching required compared to the electrical layer. Further, with an optical layer solution, the overall network costs are reduced.

While this invention has been particularly shown and described with references to example embodiments thereof, it will be understood by those skilled in the art that various changes in form and details may be made therein without departing from the scope of the invention encompassed by the appended claims.

It should be understood that the block, flow, and network diagrams may include more or fewer elements, be arranged differently, or be represented differently. It should be understood that implementation may dictate the block, flow, and network diagrams and the number of block, flow, and network diagrams illustrating the execution of embodiments of the invention.

It should be understood that elements of the block, flow, and network diagrams described above may be implemented in software, hardware, or firmware. In addition, the elements of the block, flow, and network diagrams described above may be combined or divided in any manner in software, hardware, or firmware. If implemented in software, the software may be written in any language that can support the embodiments disclosed herein. The software may be stored on any form of computer readable medium, such as random access memory (RAM), read only memory (ROM), compact disk read only memory (CD-ROM), and so forth. In operation, a general purpose or application specific processor loads and executes the software in a manner well understood in the art.

What is claimed is:

1. A method executed by an optical control plane in a configuration entity for providing path protection for dedicated paths in an optical network, the method comprising:
    accessing optical link information representing optical links forming optical paths from a source optical switch to a destination optical switch in an optical network, the optical paths including dedicated optical paths;
    in an event of a fault in a dedicated optical path, based on the optical link information accessed, determining a protection optical path from the source optical switch to the destination optical switch, the optical link information of the optical links forming the determined protection optical path meets an optical criterion; and
    signaling by the optical control plane the destination optical switch and intermediary optical switches to instantiate the optical links forming the protection optical path from the source optical switch to the destination optical switch to provide path protection for the dedicated path not experiencing the fault in the optical network.

2. The method of claim 1 wherein determining the protection optical path includes finding in a dynamic manner, an optical path from the source optical switch to the destination optical switch that meets:
    i) a first optical criterion that each optical link forming the optical path supports a wavelength sent by the source optical switch and received by the destination optical switch, and
    ii) a second optical criterion that optical impairments of each optical link forming the optical path, collectively, allows an optical signal sent by the source optical switch to be received by the destination optical switch.

3. The method of claim 2 wherein finding includes finding the optical path from optical links that are separate from optical links forming the dedicated optical paths, but are shared in forming other protection optical paths.

4. The method of claim 2 further comprising in an event of the protection optical path does not meet the second optical criterion, signaling by the optical control plane at least one of the intermediary optical switches of the protection optical path to regenerate the optical signal in a manner that enables the optical signal sent by the source optical switch to be received by the destination optical switch.

5. The method of claim 1 wherein determining includes using a link-state routing protocol selected from a group consisting of Open Shortest Path First (OSPF), Intermediate System to Intermediate System (IS-IS), Private Network-to-Network Interface (PNNI), and Nimrod Routing Architecture to determine from the optical link information accessed, the protection optical path from the source optical switch to the destination optical switch.

6. The method of claim 1 wherein signaling by the optical control plane includes signaling a respective optical control plane in the destination optical switch and the intermediary optical switches of the protection optical path to configure the destination optical switch and the intermediary optical switches to make available use of the optical links forming the protection optical path.

7. The method of claim 6 wherein signaling by the optical control plane includes reserving optical layer resources on the destination optical switch and the intermediary optical switches of the protection optical path with a reservation protocol selected from a group consisting of Resource ReSerVation Protocol-Traffic Engineering (RSVP-TE), Next Step In Signaling(NSIS), Network Layer Signaling (NLS), Private Network-to-Network Interface (PNNI), Constraint-based Label Distribution Protocol (CR-LDP), ITU-T Recommendation Q.931, and extensions thereto.

8. The method of claim 1 wherein the configuration entity executing the method is the source optical switch.

9. The method of claim 1 further comprising, in an event of a second fault in remaining dedicated optical paths, transmitting or receiving traffic on the instantiated optical links forming the protection optical path.

10. The method of claim 9 further comprising, in an event a fault in the dedicated optical path is corrected, reverting from using optical links forming the protection optical path to using optical links forming the dedicated optical path.

11. An optical control plane in a configuration entity to provide path protection for dedicated paths in an optical network, the optical control plane comprising:
   an accessing unit to access optical link information representing optical links forming optical paths from a source optical switch to a destination optical switch in an optical network, the optical paths including dedicated optical paths;
   a determining unit communicatively coupled to the accessing unit, in an event of a fault in a dedicated optical path, the determining unit, based on the optical link information accessed, determines a protection optical path from the source optical switch to the destination optical switch, the optical link information of the optical links forming the determined protection optical path meets an optical criterion; and
   a signaling unit communicatively coupled to the determining unit to signal the destination optical switch and intermediary optical switches to instantiate the optical links forming the protection optical path from the source optical switch to the destination optical switch to provide path protection for the dedicated path not experiencing the fault in the optical network.

12. The optical control plane of claim 11 wherein the determining unit includes a finding unit to find in a dynamic manner, an optical path from the source optical switch to the destination optical switch that meets:
   i) a first optical criterion that each optical link forming the optical path supports a wavelength sent by the source optical switch and received by the destination optical switch, and
   ii) a second optical criterion that optical impairments of each optical link forming the optical path, collectively, allows an optical signal sent by the source optical switch to be received by the destination optical switch.

13. The optical control plane of claim 12 wherein the finding unit finds the optical path from optical links that are separate from optical links forming the dedicated optical paths, but are shared in forming other protection optical paths.

14. The optical control plane of claim 12 further comprising a signaling unit communicatively coupled to the determining unit, in an event of the protection optical path does not meet the second optical criterion, the signaling unit signals at least one of the intermediary optical switches of the protection optical path to regenerate the optical signal in a manner that enables the optical signal sent by the source optical switch to be received by the destination optical switch.

15. The optical control plane of claim 11 wherein the determining unit uses a link-state routing protocol selected from a group consisting of Open Shortest Path First (OSPF), Intermediate System to Intermediate System (IS-IS), Private Network-to-Network Interface (PNNI), and Nimrod Routing Architecture to determine from the optical link information accessed, the protection optical path from the source optical switch to the destination optical switch.

16. The optical control plane of claim 11 wherein the signaling unit signals a respective optical control plane in the destination optical switch and the intermediary optical switches of the protection optical path to configure the destination optical switch and the intermediary optical switches to make available use of the optical links forming the protection optical path.

17. The optical control plane of claim 16 wherein the signaling unit reserves optical layer resources on the destination optical switch and the intermediary optical switches of the protection optical path using a reservation protocol selected from a group consisting of Resource ReSerVation Protocol-Traffic Engineering (RSVP-TE), Next Step In Signaling(NSIS), Network Layer Signaling (NLS), Private Network-to-Network Interface (PNNI), Constraint-based Label Distribution Protocol (CR-LDP), ITU-T Recommendation Q.931, and extensions thereto.

18. The optical control plane of claim 11 wherein the configuration entity is the source optical switch.

19. The optical control plane of claim 11 further comprising a transceiver communicatively coupled to the signaling unit, in an event of a second fault in remaining dedicated optical paths, the transceiver transmits or receives traffic on the instantiated optical links forming the protection optical path.

20. The optical control plane of claim 19 further comprising reverting unit communicatively coupled to the transmitting unit or receiving unit, in an event of a fault in the dedicated optical path is corrected, the reverting unit reverting from using optical links forming the protection optical path to using optical links forming the dedicated optical path.

21. A computer program product comprising a computer readable medium having a computer readable program, the computer readable program when loaded into a computer processor transforms the computer processor into a programmed computer processor and when executed causes the programmed computer processor to:
   access optical link information representing optical links forming optical paths from a source optical switch to a destination optical switch in an optical network, the optical paths including dedicated optical paths
   in an event of a fault in a dedicated optical path, based on the optical link information accessed, determine a protection optical path from the source optical switch to the destination optical switch, the optical link information of the optical links forming the determined protection optical path meets an optical criterion; and
   using an optical control plane to signal the destination optical switch and intermediary optical switches to instantiate the optical links forming the protection optical path from the source optical switch to the destination optical switch to provide path protection for the dedicated path not experiencing the fault in the optical network.

* * * * *

UNITED STATES PATENT AND TRADEMARK OFFICE
CERTIFICATE OF CORRECTION

PATENT NO. : 8,532,481 B2  
APPLICATION NO. : 12/694398  
DATED : September 10, 2013  
INVENTOR(S) : Thomas T. Rarick et al.

Page 1 of 1

It is certified that error appears in the above-identified patent and that said Letters Patent is hereby corrected as shown below:

On the title page of the patent under Item (12): "Karjck et al" should read -- Rarick et al --

On the title page of the patent under Item (75) Inventors: please delete "Karjck" and insert -- Rarick --

On the title page of the patent under Item (75) Inventors: please delete "Loung" and insert -- Leung --

In the Claims:

Claim 20, column 10, line 34, before "reverting", insert -- a --

Signed and Sealed this  
Twenty-second Day of October, 2013

Teresa Stanek Rea  
*Deputy Director of the United States Patent and Trademark Office*